United States Patent [19]

Suzuki et al.

[11] Patent Number: 4,945,255
[45] Date of Patent: Jul. 31, 1990

[54] POWER SOURCE DEVICE

[75] Inventors: Koji Suzuki; George Nagahira, both of Yokohama; Kazuyoshi Takahashi, Kawasaki; Kunio Yoshihara, Tokyo; Toshiro Matsui, Kawasaki; Tadashi Ishikawa, Tokyo, all of Japan

[73] Assignee: Canon Kabushiki Kaisha, Tokyo, Japan

[21] Appl. No.: 175,571

[22] Filed: Mar. 28, 1988

Related U.S. Application Data

[63] Continuation of Ser. No. 626,396, Jun. 29, 1984, abandoned.

[30] Foreign Application Priority Data

Jul. 5, 1983 [JP] Japan ................................. 58-122046
Jul. 5, 1983 [JP] Japan ................................. 58-122047
Jul. 5, 1983 [JP] Japan ................................. 58-122048

[51] Int. Cl.$^5$ .................................................. H02S 3/00
[52] U.S. Cl. ........................................ 307/17; 307/150; 361/235; 336/92; 323/361; 315/411; 355/200
[58] Field of Search ..................... 361/235; 307/17, 31, 307/43, 52, 83, 150; 336/65, 73, 90, 92; 315/411; 323/257, 255, 242, 361; 355/3 CH, 14 CH; 363/21, 25, 26, 22, 90, 126

[56] References Cited

U.S. PATENT DOCUMENTS

| | | | |
|---|---|---|---|
| 2,859,337 | 11/1958 | Rietueld | 336/73 X |
| 2,968,738 | 1/1961 | Pinteil | 307/150 |
| 3,845,352 | 10/1974 | Newman et al. | 315/411 X |
| 4,268,161 | 5/1981 | Nakahata et al. | 355/3 CH |
| 4,293,903 | 10/1981 | Muchida et al. | 363/126 X |
| 4,429,260 | 1/1984 | Truskalo | 315/411 |
| 4,438,478 | 3/1984 | Matsuyama | 307/31 X |

Primary Examiner—Derek S. Jennings
Attorney, Agent, or Firm—Fitzpatrick, Cella, Harper & Scinto

[57] ABSTRACT

A power source device including a lower voltage inverter transformer having plural secondary windings and a higher voltage inverter transformer having a primary winding connected directly to one of the secondary windings of the lower voltage inverter transformer without any rectifying circuit or inverter circuit interposed therebetween. The lower voltage and higher voltage transformers are contained in the same casing, the internal space of which is filled with an electrically insulative material to provide a unit device.

12 Claims, 3 Drawing Sheets

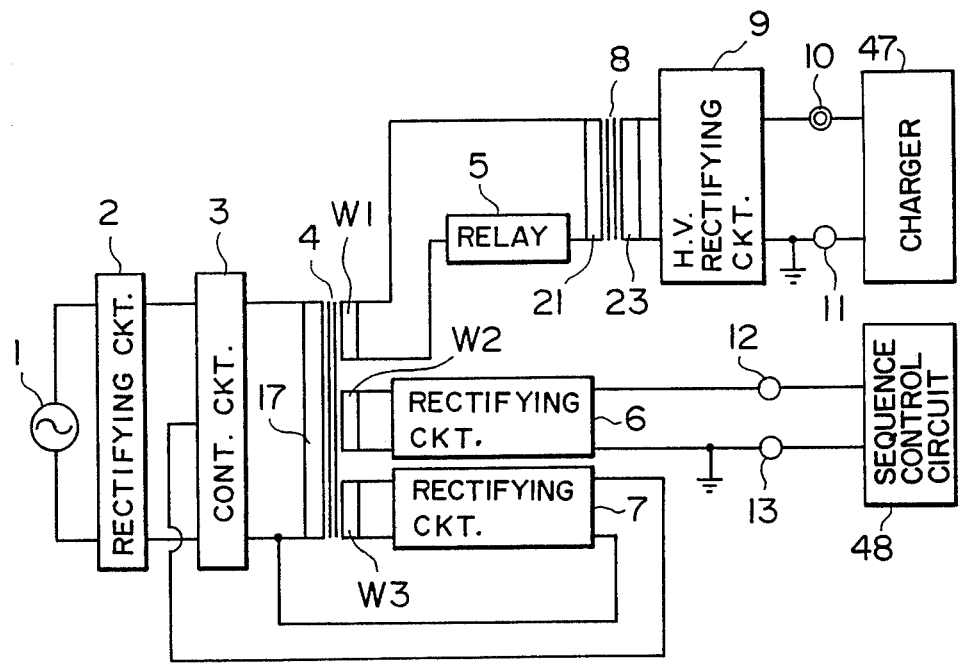
F I G. 1
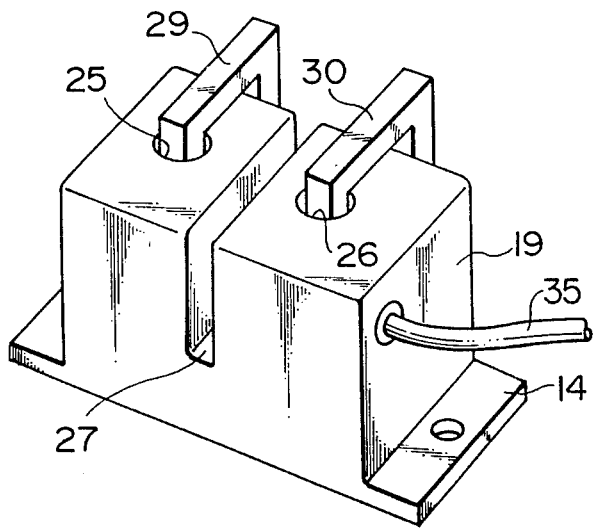
F I G. 2

POWER SOURCE DEVICE

This application is a continuation of application Ser. No. 626,396 filed June 29, 1984, now abandoned.

BACKGROUND OF THE INVENTION

This invention relates generally to a power source device and, to more particularly, a power source device effectively applicable to an electronic image forming apparatus such as an electronic copying apparatus, electronic printer or the like which requires two kinds of power sources, a lower voltage source and a higher voltage source.

In this type of electronic image forming apparatus, the lower voltage source for sequence control and the higher voltage source for power supply to a charger are correlated with each other in such a manner that AC power from a commercially available AC power source is converted, through a lower voltage transformer and a rectifying circuit, into DC power of lower voltage which is on one hand supplied to a sequence control circuit, lamp, solenoid or the like and is on the other hand supplied to the primary winding of a higher voltage transformer of the higher voltage source for charger power supply. In such an arrangement, the higher voltage output is limited because of the duplex restriction by both the conversion efficiency in the lower voltage source and the conversion efficiency in the higher voltage source, and therefore, the energy efficiency is remarkably degraded. Further, such an arrangement requires duplicate driving circuits for the lower voltage transformer and the higher voltage transformer, which leads to an increase in the number of parts and bulkiness of the power source device as well as in the manufacturing cost.

SUMMARY OF THE INVENTION

It is accordingly a primary object of the present invention to provide a power source device which has an improved power conversion efficiency and a higher reliability relative to conventiond devices, while requiring a smaller number of parts.

Another object of the present invention is to provide a compact power source device having a high packaging density.

Still another object of the present invention is to provide a power source device which is adapted to suppress temperature increases to prevent malfunctions of the circuit elements.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a block diagram of a power source device according to one embodiment of the present invention.

FIG. 2 is a perspective view showing a power source device according to one embodiment of the present invention.

DESCRIPTION OF THE PREFERRED EMBODIMENTS

Figure 3:
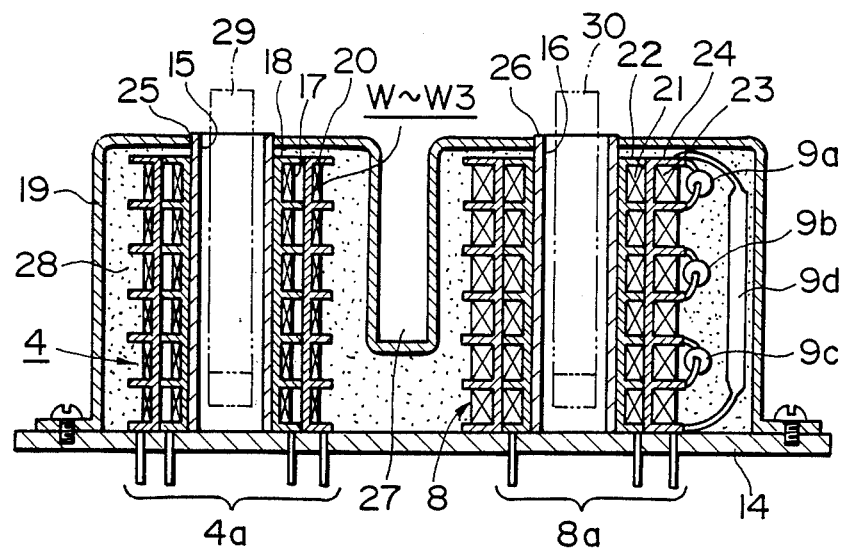
FIG. 3 is a vertical cross-section showing the embodiment of FIG. 2.

Referring now to the block diagram of FIG. 1 showing one embodiment of the present invention, a commercially available AC power source 1 is connected to an input terminal of a rectifying circuit 2. The rectifying circuit 2 has an output terminal to which a control circuit 3 is connected. The control circuit 3 drivingly controls a lower voltage inverter transformer 4. Denoted at W1, W2 and W3 in this drawing are secondary windings of the lower voltage inverter transformer 4.

The control circuit 3 includes a switching transistor oscillation circuit, pulse width modulation circuit, error amplifier and the like (these elements not being shown in the drawing). Another rectifying circuit 7 receives, as an input, the output from the secondary winding W3 and provides a rectified output. The control circuit 3 is adapted to compare the rectified output from the rectifying circuit 7 with a reference value to control the energization period of the lower voltage inverter transformer 4 so that the rectified output from the rectifying circuit 7 is maintained constant.

A further rectifying circuit 6 is provided which receives, as an input, the output from the secondary winding W2 and provides rectified outputs at terminals 12 and 13. Thus, a voltage of about 24 V, for example, is supplied to a lower voltage circuit such as a sequence control circuit 48, or a lamp, solenoid or the like (not shown) connected to these terminals.

The secondary winding W1 is connected to a primary winding of a higher voltage inverter transformer 8 through an electrical or mechanical switch 5 such as a relay. A higher voltage rectifying circuit 9 is connected to the secondary winding of the higher voltage inverter transformer 8. The rectified output of the rectifying circuit 9 is maintained at a constant voltage owing to the constant-voltage characteristics of the control circuit 3 and higher voltage inverter transformer 8 themselves. This constant voltage is supplied to a higher voltage circuit such as a charger 47 or the like connected to terminals 10 and 11. In this embodiment, the switch 5 comprises a relay adapted to be actuated or deactuated in response to a sequence control signal to control application of a higher voltage to the charger.

In accordance with the present invention, as described above, the secondary winding W1 of the lower voltage inverter transformer 4 is directly connected to the primary side of the higher voltage inverter transformer 8 without any rectifying circuit or inverter circuit interposed therebetween. Therefore, a driving circuit is no longer necessary on the primary side of the higher voltage inverter transformer. As a result, any losses due to switching of the driving, circuit and other electric losses are eliminated, whereby the power conversion efficiency is significantly improved. Further, generation of noises due to the switching of the driving circuit and generation of heat due to the switching loss are prevented. Moreover, the number of parts is decreased. Accordingly, the reliability of the device is remarkably improved while the size and manufacturing cost are substantially reduced in accordance with the present invention.

As an alternative, the higher voltage inverter transformer 8 may have several secondary windings in order to supply powers to plural chargers of different charging voltages.

In the above-described embodiment, the control circuit 3 is explained as having a switching transistor oscillation circuit, pulse width modulation circuit, error amplifier or the like so that it is implied that the control circuit 3 is a separately-excited type inverter. However, the control circuit 3 may be simplified as a self-exciting inverter in which a feedback winding is added to apply a power to the base of the switching transistor but the oscillation circuit is eliminated.

In the present embodiment, the stabilizing output of the lower voltage inverter transformer 4 is provided by a rectification output of the secondary winding W3. However, the present invention is not limited thereto, and the rectification output of the secondary winding W2 may be a stabilizing output. It is also easy to arrange the device to stabilize the output of the secondary winding W1 or the output of the higher voltage inverter transformer 8 itself.

Figure 6:
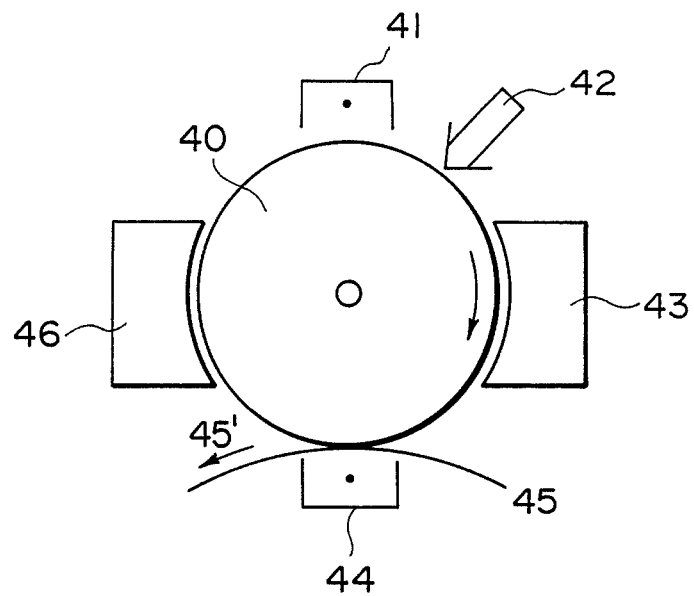
FIG. 6 is a schematic view showing an example of an electrophotographic apparatus to which a power source device of the present invention is applicable.

An example of the electrophotographic apparatus to which the power source device of the present invention is applicable is shown in the schematic view of FIG. 6. The electrophotographic apparatus includes a photosensitive member 40 which is rotatively driven in the direction of arrow by an unshown mechanism. A charger 41 applies charges of predetermined polarity to the photosensitive member 40. Subsequently, the photosensitive member 40 is subjected to imagewise exposure as denoted by an arrow 42 so that an electrostatic latent image is formed on the photosensitive member. The thus formed latent image is visualized by a developing device 43. The developed image is transferred by a transfer charger 44 to a transfer material, 45 which is fed in the direction of arrow 45' by an unshown mechanism. Any residual developer remaining on the photosensitive member 40 after transfer is removed by a cleaner 46 so that the photosensitive member 40 is prepared for repeated use. The power source device of the present invention as has been described in the foregoing is effective to apply higher voltages to the charger 41 and transfer charger 44 when they are connected to the output terminals 10 and 11 of the power source device.

The output terminals 12 and 13 are connected to a sequence control 48 for the image formation process, or to a light source, driving means or the like to apply lower voltages to these elements.

The connection of the output terminals 10 and 11; 12 and 13 is not restricted to the above-described form, and the output terminals 10 and 11 may be connected to any higher voltage circuit requiring a higher voltage while the output terminals 12 and 13 may be connected to any lower voltage circuit requiring a lower voltage.

Referring to FIGS. 2 and 3, a power source device according to one embodiment of the present invention will now be described. The power source device includes a base plate 14 on which electrically insulating cylindrical members 15 and 16 are formed. Mounted on the periphery of one 15 of the cylindrical members is a primary bobbin 18 on which primary coils 17 of the lower voltage inverter transformer 4 as described hereinbefore are provided. On the outer periphery of the primary bobbin 18, a secondary bobbin 20 having secondary coils W1, W2 and W3 is mounted.

Mounted on the other cylindrical member 16 is a primary bobbin 22 having thereon primary coils 21 of the higher voltage inverter transformer 8 as described hereinbefore. On the outer periphery of the primary bobbin 22, a secondary bobbin 24 having thereon secondary coils 23 is mounted. The lead terminals 4a and 8a from the transformers 4 and 8 extend through the base plate 14. The secondary coils 23 of the higher voltage inverter transformer 8 are connected to rectifiers 9a–9d constituting the higher voltage rectifying circuit 9.

The power source device includes a casing 19 having openings 25 and 26 formed therein to receive cylindrical members 15 and 16, respectively. The casing 19 is formed with a partitioning recess 27 which defines a partition between the bobbins 18, 20 of the lower voltage inverter transformer 4 and the bobbins 22, 24 of the higher voltage inverter transformer 8 to improve insulation with respect to the AC component. As shown in FIG. 3, the casing 19 covers these bobbins, rectifiers and other, unshown circuit elements (e.g., switching transistor, electrolytic capacitor or the like) connected to the respective coils. The space within the casing 19 is filled, by vacuum injection, with a highly electrically insulative resin 28 such as an epoxy resin. The resin after being injected is dried so that the casing and the components within the casing are formed as a unit. Denoted at 29 and 30 (phantom lines) in FIG. 3 are armatures which function as the cores of the transformers, respectively, and are inserted into the cylindrical members 15 and 16 respectively after the resin in the casing is dried. Denoted at 35 in FIG. 2 is a wire to be connected to an input commercially available power source.

As described above, both the lower voltage inverter transformer 4 and the higher voltage inverter transformer 8 are contained in the same casing 19, and the space within the casing is filled with a highly electrically insulating resin to provide a unit part. Therefore, the insulation distances between various parts are minimized so that high packaging density is ensured. Thus the size of the power source device can be exceedingly decreased.

In the above-described embodiment, the rectifiers 9a–9d constituting the higher voltage rectifying circuit 9 are formed as a unit with the coils of the transformer within the casing 19 by the injected resin. As an alternative, a circuit element having a common earth with the input commercially available power source and called a primary circuit in the field of safety standards may be contained in the casing and made as a unit with the other parts by the injected insulating material to minimize the insulation distance. This leads to a further reduction in size of the power source device.

In the illustrated embodiment, the primary coils and secondary coils of the lower voltage inverter transformer 4 are mounted on the separate bobbins 18 and 20. However, these coils may be mounted on the same bobbin.

Figure 4:
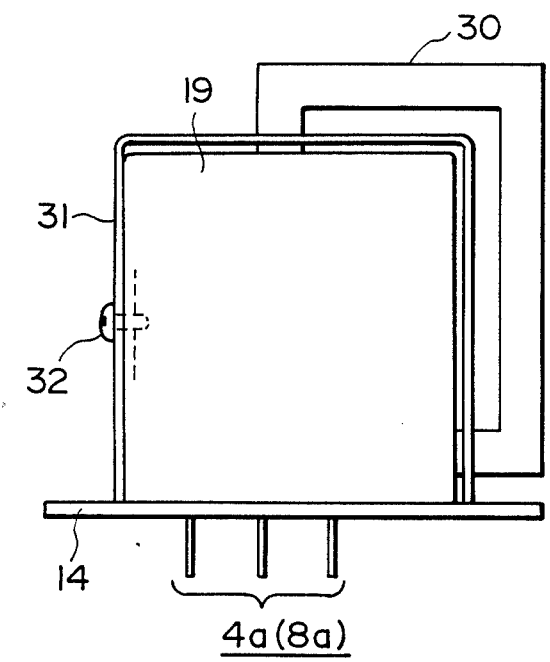
FIG. 4 is a side view showing a power source device having a heat sink attached to the unit case thereof.

FIG. 4 is a side view showing another embodiment of the present invention in which the power source device has a heat sink 31 attached thereto. In this embodiment, a highly electrically insulative and highly heat-conductive resin is used as the insulating material. The heat sink 31 is secured to the outer surface of the casing 19 by a screw 32. The casing 19 is also made of a highly heat-conductive resin.

Figure 5:
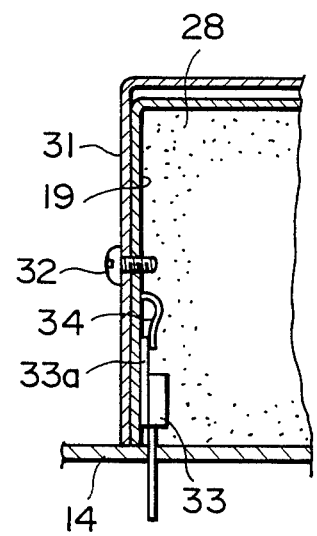
FIG. 5 is a fragmentary cross-section showing a power source device of the present invention in which a radiating fin of a switching transistor is held on the inner surface of the unit case of the power source device.

FIG. 5 shows a modification of FIG. 4 embodiment. The power source device shown in FIG. 5 includes a switching transistor 33 which is formed with a radiating fin 33a. The radiating fin 33a abuts against the inner surface of the wall of the casing 19 which is in intimate contact with the heat sink 31 similar as the heat sink shown in FIG. 4. The radiating fin 33a is held in its place by a keeping element 34 formed on the inner surface of the casing. Thus, the switching transistor 33 is connected to the heat sink 31 with minimum thermal resistance. Therefore, the heat generated by the switching transistor 33 is effectively radiated, so that any malfunction which otherwise may caused by the heat generation is prevented to improve the reliability. Component 33 may, of course, be any other circuit element which generates a large amount of heat, such as an electrolytic capacitor.

In general, the power source unit contains a number of circuit elements, including transformers, which generate heat, and the life of a circuit element and the temperature thereof are correlated closely to each other. For example, semiconductors are very sensitive to temperature increases since they lead directly to thermal runaway. Further, the length of life of an electrolytic capacitor or the like is exceedingly reduced by the temperature increase. In accordance with the present invention, the heat of such circuit elements is conducted through the highly heat-conductive resin, casing of the power source device and heat sink, so that the heat is efficiently radiated. As a result, any malfunction of the circuit elements owing to the temperature increase can be prevented to improve the reliability of the circuit elements.

In the illustrated embodiment, the heat sink is provided by a shielding plate which covers the entire casing 19 in order to shield unwanted radiation noises from the coils of the higher voltage inverter transformer 8. If, however, such shielding is not necessary, the shielding plate, i.e., heat sink, may be provided only on the surface area from which a large amount of heat is generated. The heat sink may, of course, be a part of the casing of the power source unit or a part of the housing of the main assembly.

In accordance with the present invention as has hitherto been described, a power source device having improved power conversion efficiency with decreased number of parts is provided. Further, the size of the power source device is reduced owing to the integration of the lower voltage transformer with the higher voltage transformer as well as high packaging density. Moreover, malfunction of circuit elements due to the generation of heat can be prevented.

While the invention has been described with reference to the structures disclosed herein, it is not confined to the details set forth and this application is intended to cover such modifications or changes as may come within the purposes of the improvements or the scope of the following claims.

What is claimed is:

1. A power source device, comprising:
a first transformer having a primary winding to which an input power is to be applied and at least first and second secondary windings, wherein said first transformer is adapted to supply a low voltage output from its second secondary winding to a low voltage load through a low voltage rectifier;
a second transformer having primary and secondary windings, said primary winding of said second transformer being connected without rectification to said first secondary winding of said first transformer, wherein said second transformer is adapted to supply a high voltage output to a high voltage load through a high voltage rectifier; and
a switch, disposed between said first secondary winding of said first transformer and said primary winding of said second transformer, for connecting and disconnecting the high voltage output from said second transformer to the high voltage load.

2. A device according to claim 1, further comprising a control circuit connected to said primary winding of said first transformer to drivingly control said first transformer.

3. A device according to claim 2, wherein said first transformer has a third secondary winding and wherein said control circuit compares a rectified output from a rectifying circuit, to which an output produced at said third secondary winding is applied as an input, with a reference value to control the energization period of said first transformer so that the rectified output is maintained constant.

4. A device according to claim 1, further comprising a casing member for containing said first and second transformers, and a highly electrically insulative and highly heat-conductive material with which the internal space of said casing is filled so that said first and second transformers are embedded in the insulative material.

5. A device according to claim 4, wherein said casing houses (1) a control circuit for drivingly controlling said first transformer and (2) a higher voltage rectifying circuit connected to the secondary side of said second transformer.

6. A device according to claim 4, wherein said casing is provided with a heat-radiating element attached thereto.

7. A device according to claim 4, wherein a circuit element contained in said casing and connected to said first transformer is in abutting-engagement with the inner surface of said casing.

8. A device according to claim 4, wherein a heat-radiating element covers the entire surface of said casing and acts also as a shielding means for shielding unwanted radiation noise from said transformer.

9. Am image forming apparatus having a power source device, said power source device comprising:
a first transformer having a primary winding to which an input power is to be applied and at least first and second secondary windings, wherein said first transformer is adapted to supply a low voltage output from its second secondary winding to a low voltage load through a low voltage rectifier;
a second transformer having primary and secondary windings, said primary winding of said second transformer being connected without rectification to said first secondary winding of said first transformer, wherein said second transformer is adapted to supply a high voltage output to a high voltage load through a high voltage rectifier; and
a switch, disposed between said first secondary winding of said first transformer and said primary winding of said second transformer, for connecting and disconnecting the high voltage output from said second transformer to the high voltage load; and
said image forming apparatus including a sequence control circuit for controlling the image forming apparatus, wherein said sequence control circuit comprises said low voltage load.

10. An image forming apparatus having a power source device, said power source device comprising:

a first transformer having a primary winding to which an input power is to be applied and at least first and second secondary windings, wherein said first transformer is adapted to supply a low voltage output from its second secondary winding to a low voltage load through a low voltage rectifier;

a second transformer having primary and secondary windings, said primary winding of said second transformer being connected without rectification to said first secondary winding of said first transformer, wherein said second transformer is adapted to supply a high voltage output to a high voltage load through a high voltage rectifier; and a switch, disposed between said first secondary winding of said first transformer and said primary winding of said second transformer, for connecting and disconnecting the high voltage output from said second transformer to the high voltage load; and said image forming apparatus including charging means, and wherein said higher voltage load includes said charging means.

11. A device according to claim 10, wherein the charging means is disposed adjacent an image bearing member of the image forming apparatus and said second transformer is adapted to supply the higher voltage to the charging means to electrically charge the image bearing member.

12. A device according to claim 10, wherein said image forming apparatus comprises a plurality of charging means, and wherein said second transformer has a plurality of secondary windings for engaging therefrom high voltages to said plurality of charging means.

* * * * *

UNITED STATES PATENT AND TRADEMARK OFFICE
CERTIFICATE OF CORRECTION

PATENT NO. : 4,945,255
DATED      : July 31, 1990
INVENTOR(S): Koji Suzuki, et al.

It is certified that error appears in the above-identified patent and that said Letters Patent is hereby corrected as shown below:

Title page:

[56] REFERENCES CITED:

Insert --FOREIGN PATENT DOCUMENT
83-533 7/1983 European Patent Office--.

"2,859,337 11/1958 Rietueld" should read --2,859,337 11/1958 Rietveld--; and

"4,293,903 10/1981 Muchida et al." should read --4,293,903 10/1981 Mochida et al.--

Signed and Sealed this

Twenty-third Day of March, 1993

Attest:

STEPHEN G. KUNIN

Attesting Officer

Acting Commissioner of Patents and Trademarks